US011722212B2

United States Patent
Harrington et al.

(10) Patent No.: US 11,722,212 B2
(45) Date of Patent: Aug. 8, 2023

(54) TETHERING TO A SATELLITE TERMINAL

(71) Applicant: Hughes Network Systems, LLC, Germantown, MD (US)

(72) Inventors: Emanuel Harrington, Bowie, MD (US); Hasme Rafsan Jani, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 65 days.

(21) Appl. No.: 17/460,681

(22) Filed: Aug. 30, 2021

(65) Prior Publication Data
US 2023/0062019 A1     Mar. 2, 2023

(51) Int. Cl.
*H04B 7/185*     (2006.01)
*H04W 76/10*     (2018.01)
*H04W 84/12*     (2009.01)

(52) U.S. Cl.
CPC ........ *H04B 7/18513* (2013.01); *H04W 76/10* (2018.02); *H04W 84/12* (2013.01)

(58) Field of Classification Search
CPC ... H04B 7/18513; H04W 76/10; H04W 84/12
See application file for complete search history.

(56) References Cited

U.S. PATENT DOCUMENTS

| 2007/0130606 | A1* | 6/2007 | Jeong | H04H 20/12 725/100 |
|---|---|---|---|---|
| 2018/0191604 | A1 | 7/2018 | Bartlett et al. | |
| 2019/0260464 | A1 | 8/2019 | Satyajit et al. | |
| 2020/0245210 | A1* | 7/2020 | Fotheringham | H04L 45/123 |
| 2021/0114616 | A1* | 4/2021 | Altman | H04W 8/205 |

FOREIGN PATENT DOCUMENTS

EP     2829085 A1     1/2015

OTHER PUBLICATIONS

International Search Report and Written Opinion for PCT/US2022/037047 dated Oct. 26, 2022 (12 pages).

* cited by examiner

*Primary Examiner* — Jae Y Lee
(74) *Attorney, Agent, or Firm* — Bejin Bieneman PLC (57) ABSTRACT

A system includes a satellite communications terminal including a computer programmed to provide communications for user devices with a destination network. The computer detects a physical state or change in a physical state specified as a trigger to transfer the communications for the user devices with the destination network from a satellite communications channel to a cellular communications channel. Upon detecting the trigger event, the computer establishes a communications link with a cellular device and provides communications for the user devices with the destination network via the cellular device and the cellular communications channel.

19 Claims, 4 Drawing Sheets

TETHERING TO A SATELLITE TERMINAL

BACKGROUND

Satellite communications systems connect user devices with communications networks such as the Internet, allowing users access to digital services such as cloud-based data services, work related applications, social media, e-commerce, e-mail services, video conferencing, content streaming, etc. Reliance on these services has increased as remote and mobile computing have become more common. Weather conditions, interference from other communications systems, disruption of power sources, equipment malfunctions, and/or changes in loading conditions may reduce the performance or disrupt satellite communications.

DETAILED DESCRIPTION

A satellite terminal included in a satellite communications network is programmed, based on trigger events, to transfer communications from a satellite communications channel to cellular communications channel by tethering to a cellular device. Upon tethering to the cellular device, the satellite terminal is further programmed to route communications via a cellular communications channel including the cellular device. Trigger conditions can include a request from the user to transfer to cellular communications, detection that the satellite communications are disrupted, detection that one or more satellite communications performance metrics are outside of a predetermined or specified range, or detection that a performance of an available cellular communications network at a measurement time is better (typically faster) to a performance of the satellite communications network at the measurement time based on the values of one or more performance metrics.

Disclosed herein is a system comprising a satellite communications terminal including a computer and a memory, the memory including instructions such that the computer is programmed to provide communications for one or more user devices with a destination network. The computer detects a physical state or change in a physical state specified as a trigger to transfer the communications for the one or more user devices with the destination network from a satellite communications channel to a cellular communications channel. Upon detecting the trigger event, the computer establishes a communications link with a cellular device; and provides the communications for the one or more user devices with the destination network via the cellular device and the cellular communications channel.

In the system, the trigger event can be a state of an electrical signal or a change of a state of an electrical signal due to a user input requesting the satellite communications terminal to transfer the communications with the destination network from the satellite communications channel to the cellular communications channel.

In the system, the computer can further compare one or more performance metrics of the satellite communications channel with respective expected performance metrics for the satellite communications channel, wherein the trigger event is based on the comparison of the one or more performance metrics of the satellite communications channel with the respective expected performance metrics for the satellite communications channel.

In the system, the computer can further compare one or more performance metrics of the satellite communications channel with respective performance metrics of the cellular communications channel, wherein the trigger event is based on the comparison of the one or more performance metrics of the satellite communications channel with the respective performance metrics of the cellular communications channel.

In the system, the computer can further detect that the satellite communications terminal is connected via a wired communications link to the cellular device; and establish the communications link with the cellular device via the wired communications link.

In the system, the wired communications link can be a wired Universal Serial Bus (USB) connecting the cellular device to the satellite communications terminal.

In the system, the computer can further be programmed to detect that the cellular device is within a range for wireless communications with the satellite communications terminal; and establish the communications link via the wireless communications. The wireless communications can be Wi-Fi communications.

In the system, establishing the communications link with the cellular device via the wireless communications can include sending messages to a user to activate hotspot operation of the cellular device.

In the system, establishing the communications link with the cellular device via the wireless communications can include sending commands to the cellular device to activate hotspot operation of the cellular device.

In the system, the cellular device can include a second computer and a second memory, the second memory including instructions such that the second computer is programmed to activate a hotspot mode by the cellular device based on receiving the instructions to activate the hotspot mode.

In the system, detecting that the cellular device is within a range for wireless communications can include determining that the cellular device was previously registered with the satellite communication terminal.

In the system, after transferring the communications for the one or more user devices with the destination network from the satellite communications channel to the cellular communications channel, the computer can monitor the satellite communication channel; and upon detecting that the satellite communication channel is operating within a specified operating range, can transfer the communications for the one or more user devices with the destination network from the cellular communications channel to the satellite communications channel.

Further disclosed herein is a method including providing, by a satellite communications terminal, communications for one or more user devices with a destination network. The method further includes detecting a change in a physical state specified as a trigger to transfer the communications for the one or more user devices with the destination network from a satellite communications channel to a cellular communications channel; upon detecting the trigger event, establishing a communications link with a cellular device; and providing the communications for the one or more user devices with the destination network via the cellular device and the cellular communications channel.

In the method, the trigger event can be a state of an electrical signal or a change of a state of an electrical signal due to a user input requesting the satellite communications terminal to transfer the communications with the destination network from the satellite communications channel to the cellular communications channel.

The method can further include comparing values of one or more performance metrics of the satellite communications channel with respective specified ranges of values for the performance metrics for the satellite communications channel, wherein the trigger event is based on the comparison of the values of one or more performance metrics of the satellite communications channel with the respective specified ranges of values of the performance metrics for the satellite communications channel.

The method can further include comparing one or more values of performance metrics of the satellite communications channel with respective values of performance metrics of the cellular communications channel, wherein the trigger event is based on the comparison of the one or more values of the performance metrics of the satellite communications channel with the respective values of the performance metrics of the cellular communications channel.

The method can further include detecting that the satellite communications terminal is connected via a wired Universal Serial Bus (USB) to the cellular device; and establishing the communications link with the cellular device via the wired Universal Serial Bus (USB).

The method can further include detecting that the cellular device is within a range for wireless communications with the satellite communications terminal; confirming that the cellular device is included on a list of registered cellular devices to provide access to the cellular communications channel; and establishing, based on the confirmation that the cellular device is included on the list of the registered cellular devices, the communications link via the wireless communications.

In the method, establishing the communications with the cellular device via the wireless communications can include sending messages to a user to activate a hotspot mode of the cellular device or sending commands to the cellular device to activate the hotspot operation of the cellular device.

Figure 1:
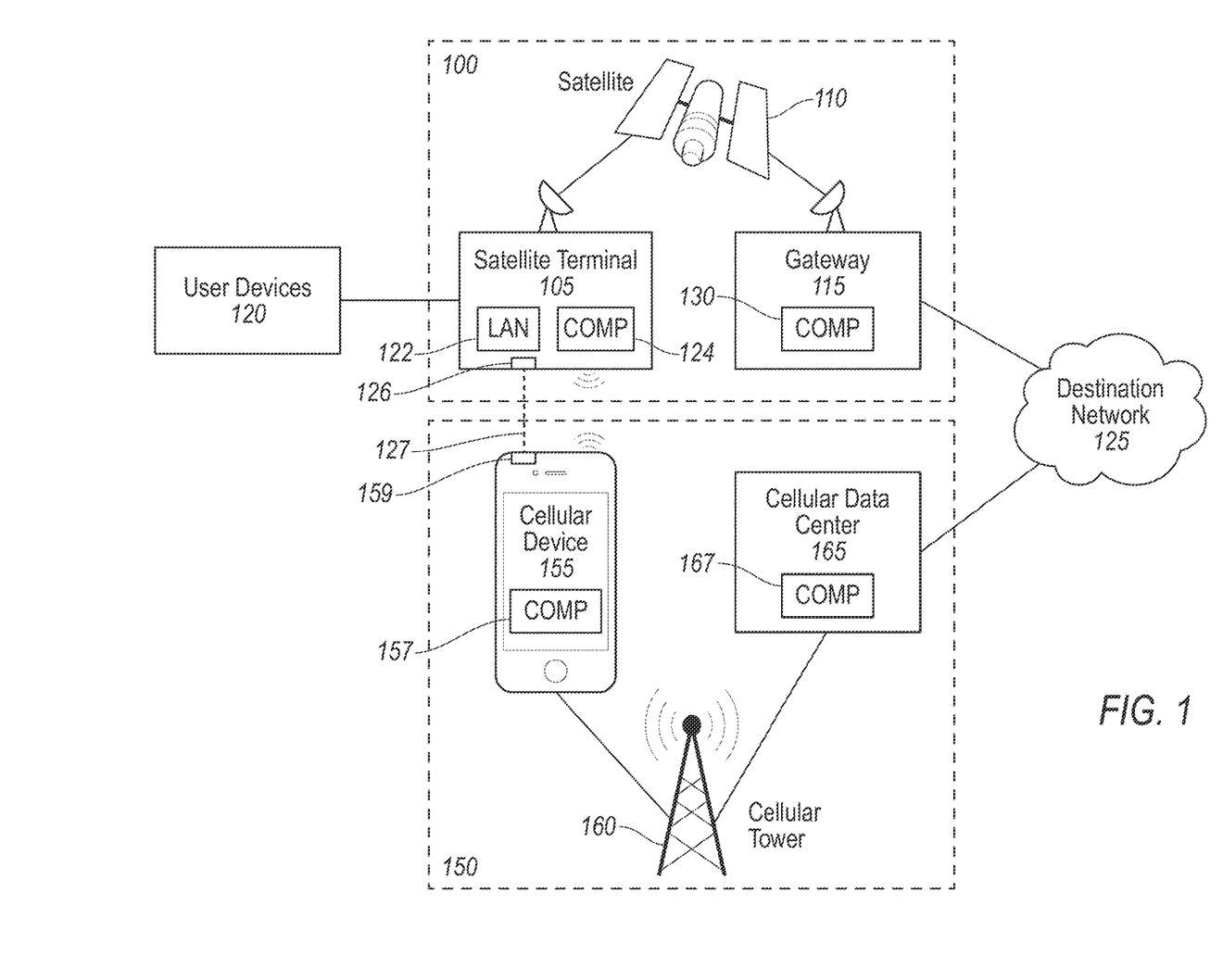
FIG. 1 is a block diagram of an example satellite communications network including the option of tethering to a cellular communications network.

FIG. 1 illustrates an example satellite communications network 100 including one or more satellite terminals 105, a satellite 110 and a gateway 115. The satellite terminals 105 communicatively couple one or more user devices 120 to the satellite communications network 100 via a local area network (LAN) 122. The one or more satellite terminals 105 utilize radio frequency communications to communicate with the gateway 115 via the satellite 110. The gateway 115 further communicatively couples the satellite terminals 105 and associated user devices 120 with a destination network 125. Note that the satellite communications network 100 will typically include many (e.g., hundreds or thousands) of satellite terminals 105, multiple satellites 110, and multiple gateways 115. For ease of understanding, the satellite communications network 100 will be described herein based on the operation of one satellite terminal 105, one satellite 110 and one gateway 115.

Still referring to FIG. 1, a cellular communications network 150 is available to provide a cellular communications channel between the satellite terminal 105 and the destination network 125. The cellular communications network 150 includes the cellular device 155, a cellular tower 160 and a cellular data center 165. Note that the cellular communications network 150 will typically include many cellular devices 155 (e.g., thousands or millions), many cellular towers (e.g., thousands) and multiple cellular data centers. For ease of understanding, the operation of the cellular communications network 150 will be described herein based on the operation of one cellular device 155, one cellular tower 160 and one cellular data center 165.

The satellite communications network 100 includes one or more satellite terminals 105. Each of the satellite terminals 105 includes a local area network (LAN) 122 and a computer 124. The satellite terminals 105 provide communications between user devices 120 and the satellite communications network 100. Each satellite terminal 105 may further include a Universal Serial Bus (USB) port 126.

The local area network (LAN) 122 can be any suitable network system for communicatively coupling with user devices 120 over a relatively small geographic area, e.g., a building or campus (collection of neighboring or proximate buildings). For example, the local area network (LAN) 122 may include wired mechanisms such as Ethernet and/or wireless mechanisms, for example Wi-Fi® operating according to IEEE 802.11, to communicate with the user devices 120. The local area network (LAN) 122 is programmed to communicatively couple the user devices 120 with the computer 124.

The computer 124 is programmed to provide two-way communications between the user devices 120 and the satellite communications network 100. The computer 124 is programmed to receive forward transmissions from the gateway 115 and forward these transmissions to the user devices 120. The computer 124 is further programmed to receive user return transmissions from the user devices 120. Based on the user return transmissions, the computer 124 is programmed to generate return transmissions to the gateway 115.

As described in additional detail below, the computer 124 is further programmed to transfer communications between satellite communications, i.e., communications via a satellite communications channel including the satellite terminal 105, satellite 110 and the gateway 115, and cellular communications, i.e., communication via a cellular communications channel including the satellite terminal 105, cellular device 155, the cellular tower 160 and the cellular data center 165. A satellite communications channel in this context is a connection including radio frequency transmissions to and from a satellite for connecting two or more devices for the purposes of data transmissions. A cellular communications channel in this context is a connection including radio frequency transmissions through a cellular network including at least one cellular device for connecting two or more devices for the purposes of data transmissions. Note that, because in all cases the satellite terminal 105 provides the connection to the user devices 120, the satellite terminal 105 is included in both the satellite communications channel and the cellular communications channel.

Non-limiting examples of satellite terminals 105 include Very Small Aperture Terminals (VSATs) such as the Jupiter HT1100 and HT2010W, HN and HX VSAT terminals sold by Hughes Network Systems, LLC with the address 11717 Exploration Lane, Germantown, Md. 20876 and satellite terminals 105 configured for IP-Radio such as the HT3200 IPRadio with WR3200 indoor unit, also sold by Hughes Network Systems, LLC.

The USB port 126 is a physical, electrical, and logical connector for connecting to a USB device (e.g., a memory stick or wireless receiver for a keyboard) or to another device via a USB physical bus (wired connection) 127. In the example described below, the USB port 126 can be used to connect to the USB port 159 of the cellular device 155 via the USB physical bus 127.

The satellite 110 includes a computer and relay stations and provides two-way radio frequency (RF) communications between the gateway 115 and the satellite terminals 105. The satellite 110 computer is programmed to receive transmissions from the satellite terminals 105 and transmit the transmissions to the gateway 115. The satellite 110 computer is further programmed to receive transmissions from the gateway 115 and transmit the transmissions to the satellite terminals 105.

The gateway 115 is typically a conventional land-based transmission system and hosts several radio frequencies (RF), baseband transport and gateway-specific management operations. Each gateway 115 includes a computer 130. The computer 130 includes a processor and a memory, the memory including instructions for programming the processor. The computer 130 is programmed to control communications between the destination network 125 and the satellite terminals 105. That is, the computer 130 receives return transmissions from user devices 120 via the satellite terminals 105 and routes them to the network destination network 125, and further receives forward transmissions from the destination network 125 and transmits the forward transmissions the user devices 120.

User devices 120 are computing devices providing users access to network communications, data processing, electronic commerce, etc. Non-limiting examples of user devices include mobile telephones, laptop computers, storage devices, and tablet computing devices.

The destination network 125 represents one or more mechanisms by which the gateway 115 may communicate with other computing devices. Accordingly, the destination network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short-Range Communications (DSRC), 5G/LTE, etc.), local area networks (LAN) and/or wide area networks (WAN), including the Internet, providing data communication services.

The cellular device 155 includes a receiver and transmitter for sending and receiving radio frequency communications to the cellular tower 160 and has a service plan such that the cellular device 155 can communicate via the cellular network 150, for example a mobile telephone. The cellular device 155 further includes a computer 157 and one or both of a USB port 159 and a Wi-Fi router (not shown). The computer 157 is programmed to provide data communications via the cellular tower 160 and cellular data center 165 to connect the cellular device 155 with the destination network 125. As described in additional detail below, the computer 157 is further programmed to communicate with the satellite terminal 105 via one or both of the USB port 159 or the Wi-Fi router to provide data communications between the user devices 120 connected to the satellite terminal 105 and the destination network 125.

The cellular device 155 is typically a mobile telephone having a service plan for communications on the cellular network 150 but may be any computing device that is enabled for cellular communications, has access to the cellular network 150 via a service plan, and has the ability to support communications with user devices 120 via the USB port 159 or the Wi-Fi router. In some (most) cases, the cellular device 155 is a user device 120 that is repurposed for providing a communications link between the satellite terminal 105 and the cellular network 150.

The USB port 159 is a physical, electrical and logical connector for connecting to a USB device or to another device via a USB physical bus (wired connection) 127. For example, the USB port 159 can be used to connect to the satellite terminal 105 via the USB physical bus 127.

The cellular device 155 communicates with the cellular tower 160 based on a cellular communications standard. Examples of cellular communications standards include GSM (Global System for Mobile Communications), CDMA2000, 4G and 5G.

The cellular tower 160 is a cellular-enabled site where antennas and electronic communications equipment are placed such that the cellular tower 160 can receive forward radio frequency transmissions from the cellular data center 165 and relay the transmissions to the cellular device 155 and can further receive return transmissions from the cellular device 155 and relay the transmissions to the cellular data center 165. The electronic communications equipment typically includes one or more sets of transmitter/receivers, digital signal processors, control electronics, primary and backup electrical power sources and sheltering.

The cellular data center 165 manages cellular communications between multiple cellular devices 155 and the destination network 125. The cellular data center 165 includes multiple radio frequency transceivers, and a computer 167. The computer 167 receives return transmissions from cellular devices 155 via the cellular towers 160 and routes them to the destination network 125, and further receives forward transmissions from the destination network 125 and transmits the forward transmissions to the cellular devices 155.

In the case that the satellite terminal 105 is tethered to the cellular device 155, the cellular data center 165 can route communications from the user devices 120 to the destination network 125 via the cellular communications channel including the satellite terminal 105, the cellular device 155, the cellular tower 160 and the cellular data center 165. Tethering, as that term is used herein, means the sharing of the cellular device 155 connection to the destination network 125 with other connected computers. Tethering is sometimes also referred to as "Phone as Modem" (PAM).

Figure 2:
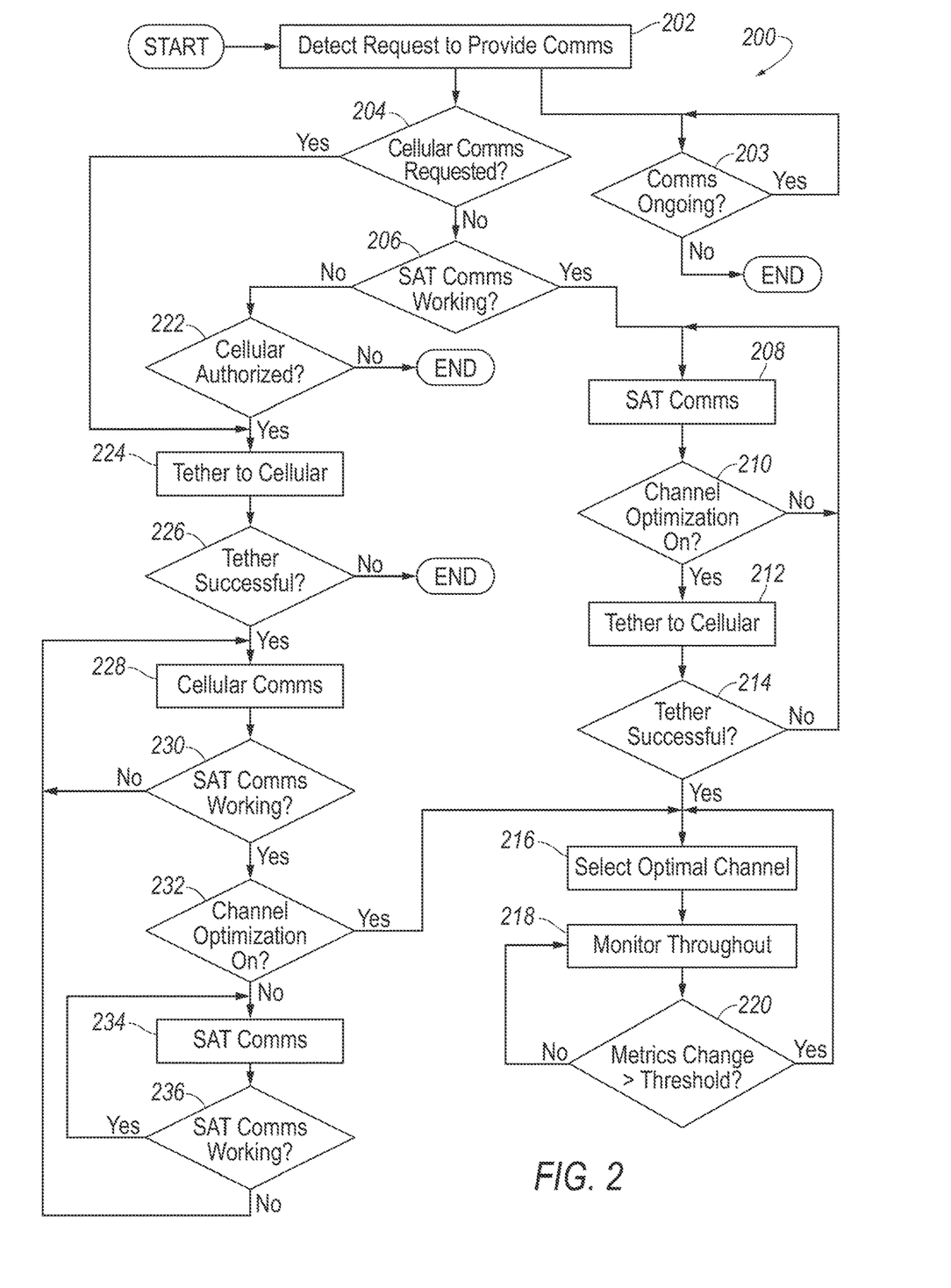
FIG. 2 is a flow chart of an example process for transferring communications between the satellite communications network and the cellular communications network.

FIG. 2 is a flow chart for an example process 200 for transferring communications between the satellite communications network 100 and the cellular communications network 150. The process 200 begins in a block 202.

In the block 202, the computer 124 in the satellite terminal 105 detects a change in a physical state of the satellite terminal 105, e.g., a change in an electrical signal due to a change in a switch position, increase in a power supply level above a threshold level, a change in state of a signal received from a user device 120, etc., that is an indication that the satellite terminal 105 is requested to provide communications for user devices 120. As non-limiting examples, the change in the physical state may be a change in an electrical signal caused by a user activating the satellite terminal 105, a user device 120 sending a message to the satellite terminal 105, or a message received from the satellite 110. Upon detecting the communications trigger event, the process 200 continues in blocks 203 and 204.

In the block 203, a subprocess for monitoring ongoing communications takes place. The subprocess can be executed continuously or at selected intervals, while blocks 204-236, described below, are executed to determine whether the process 200 should continue or be ended. In the block 203, the computer 124 determines whether the user devices 120 or the destination network 125 are sending messages to be communicated between the user devices 120 and the destination network 125. In the case that communications are ongoing, the computer 124 continues to perform the monitoring of block 203 and blocks 204-236 of the process 200 can continue to execute. In the case the communications are no longer ongoing, the process 200 ends. The subprocess of the block 203 continues to operate as long as the process 200 is being executed.

In the block 204, the computer 204 determines whether a physical state or a change of physical state such as an electrical signal or change in an electrical signal caused by a user input and specified as a trigger event to initiate cellular communications is present at the computer 204. As non-limiting examples, a user, knowing that the satellite communications network 100 is not operating, may request that the computer 204 select cellular communications, or the satellite terminal 105 may be preset by the user to initiate cellular communications. In the case that cellular communications are requested, the process 200 continues in a block 224. Otherwise, the process 200 continues in a block 206.

In the block 206, the computer 124 determines whether satellite communications are working. Telecommunications "working" herein means that messages through the communications channel including the satellite terminal 105, the satellite 110 and the gateway 115 can be sent and received and that the values of one or more performance metrics of the communications path, e.g., throughput and/or latency, are within a specified range. The computer 124 may query and/or automatically receive messages from the gateway 115 indicating the values of performance metrics for the satellite communications network 100, send and/or receive test messages for which latency and throughput are measured, etc., to determine whether the satellite communications are working. An example for determining the health of the communication link could be to establish a receive and transmit speed test using one of many platforms such as www.speedtest.net as accessed at the time of filing this application. The test could be initiated by the computer 124 or by the computer 130 of the gateway 115. If the uplink and/or downlink speed falls below a predetermined threshold, the satellite terminal 105 would switch to using the cellular device 155. In the case that satellite communications are working, the process 200 continues in a block 208. Otherwise, the computer 124 recognizes the values of performance metrics outside of the specified range as a specified trigger event to initiate cellular communications and the process 200 continues in a block 222.

In the block 208, the computer 124 sends and receives messages between one or more user devices 120 and the destination network 125 via the satellite communications channel including the satellite terminal 105, the satellite 110 and the gateway 115. The process 200 continues in a block 210.

In the block 210, the computer 124 determines whether channel optimization is "on." Channel optimization being "on" herein means that the computer 124 is requested, for example by a user, to optimize communications between the user devices 120 and the destination network 125 between the satellite communications channel and the cellular communications channel and has programming to execute such a request. As non-limiting examples, the request may be a change of an electrical signal due to an input from the user, or a previously stored electrical signal indicating that channel optimization is requested that the computer 124 may query. The computer 124 determines, based on programming, and user inputs or settings, whether channel optimization is on. In the case that channel optimization is on, the process 200 continues in a block 212. Otherwise, the process 200 continues in the block 208 (and continues communications via the satellite communications channel).

Figure 3:
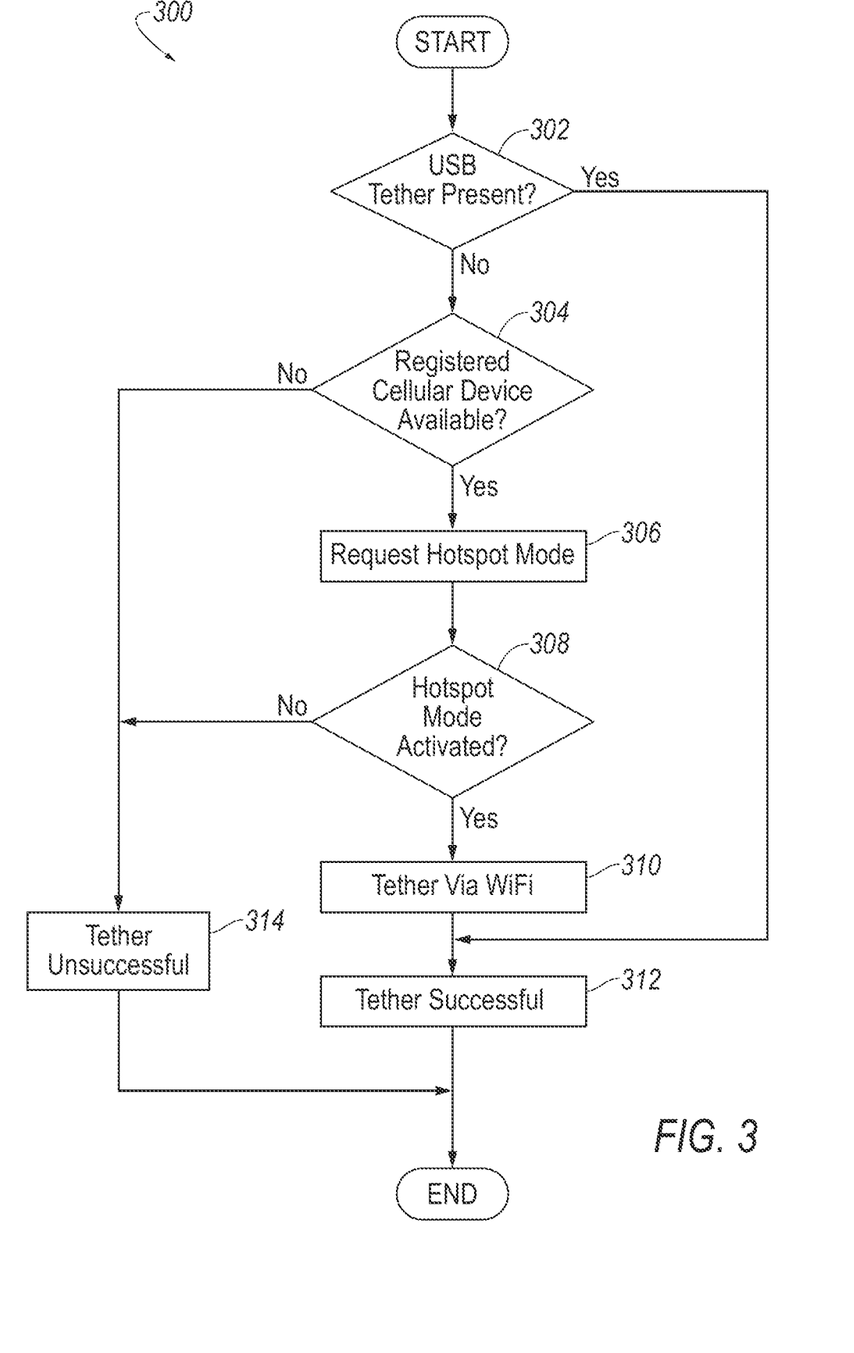
FIG. 3 is a flow chart of an example process for tethering a satellite terminal to a cellular device.

In the block 212, the computer 124 attempts to tether to the cellular device 155 for example, according to the process 300 as shown in FIG. 3 and described below. The computer 124 implements the process 300 and then continues in the block 214.

In the block 214, the computer 124 determines whether tethering to the cellular device 155, based on the results of the process 300, was successful. In the case that tethering was successful, the process 200 continues in a block 216. Otherwise, the process 200 continues in the block 208 (and continues communications via the satellite communications channel).

Figure 4:
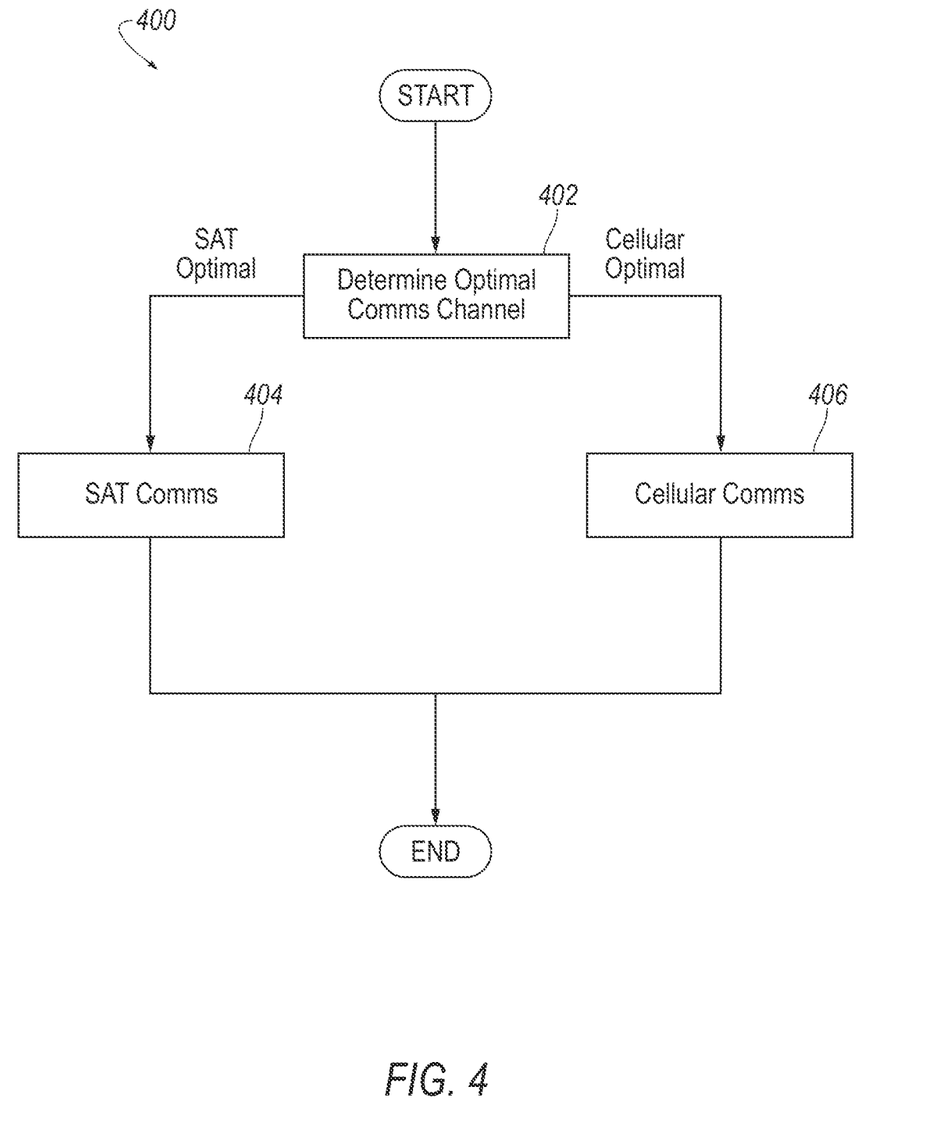
FIG. 4 is a flow chart of an example process for selecting between a satellite communications channel and a cellular communications channel.

In the block 216, the computer 124 selects, for example according to the process 400 as shown in FIG. 4 and described below, an optimal communications channel between the satellite communications channel and the cellular communications channel. Upon selecting the optimal communications channel, the process 200 continues in a block 218.

In the block 218, the computer 124 monitors performance metrics for the currently operating communications channel, which can be either of the satellite communications channel, or the cellular communications channel depending on the outcome of selecting the optimal channel in block 216. The computer 124 can, for example, receive messages indicating a performance of the satellite communications channel from the gateway 115, or respectively, messages from the cellular data center 165 indicating a performance of the cellular communications channel. Alternatively, the computer 124 can perform measurements of performance metrics, by monitoring messages, and or sending and monitoring the performance of test messages. The process 200 continues in a block 220.

In the block 220, the computer 124 determines whether changes in performance metrics, or a degradation of performance metrics, greater than a threshold value. For example, the computer 124 can compare a current throughput to a value of throughput when the computer 124 selected the current communications path. The value of the throughput could be determined, for example, based on an upload and download speed test. The throughput threshold may be a percentage value, for example 10%. As another example, the test can be a ping test to a known gateway 115. The computer 124 can compare a current response time of the ping test to a previous response time of the ping test. In the case that the currently measured throughput is below the throughput when the computer 124 had selected the current communications path by more than the throughput threshold value, or the response time of the ping test is reduced by greater than a response time threshold value, the process 200 continues in the block 216 and reevaluates the optimal communications path. Otherwise, the process continues in the block 218.

In the block 222, which can follow the block 206, the computer 124 determines whether cellular communications are authorized for the satellite terminal 105. Cellular communications being authorized, as that term is used herein, means that computer 124 has received user inputs or is otherwise programmed, for example through input settings, to optionally utilize cellular communications. The computer 124 checks for user inputs and/or settings to determine whether cellular communications are authorized. In the case that cellular communications are authorized, the process 200 continues in a block 224. Otherwise, the process 200 ends. That is, in this state, satellite communications are not working, and cellular communications are not authorized.

In the block 224, the computer 124 attempts to tether to the cellular device 155 for example, according to the process 300. The computer 124 implements the process 300 and then continues in the block 224.

In the block 226, the computer 124 determines whether tethering to the cellular device 155, e.g., based on a result of the process 300, described further below, was successful. In the case that tethering was successful, the process 200 continues in a block 228. Otherwise, the process 200 ends. That is, in this state, satellite communications are not working, and cellular communications are not accessible due to the unsuccessful tethering process.

In the block 228, the computer 124 sends and receives messages between one or more user devices 120 and the destination network 125 via the satellite terminal 105 and the cellular communications channel including the cellular device 155, the cellular tower 160 and the cellular data center 165. The process 200 continues in a block 230.

In the block 230, the computer 124 determines whether satellite communications are working, as described above in reference to the block 206. In the case that satellite communications are working, the process 200 continues in a block 232. Otherwise, the process 200 continues in the block 228 (and continues cellular communications).

In the block 232, the computer 124 determines whether channel optimization is on, as described above in reference to the block 210. In the case that channel optimization is on, the process 200 continues in the block 216. Otherwise, the process 200 continues in the block 234.

In the block 234, the computer 124 sends and receives messages between the one or more user devices 120 and the destination network 125 via the satellite communications channel. The process 200 continues in a block 236.

In the block 236, the computer 124 determines whether satellite communications are working, as described above in reference to the block 204. In the case that satellite communications are working, the process 200 continues in the block 234. Otherwise, the process 200 continues in the block 228 (and continues cellular communications).

FIG. 3 is a flow chart for an example process 300 for tethering a satellite terminal to a cellular device. The process 300 can be a sub-process of the process 200 as mentioned above. The process 300 begins in a block 302.

In the block 302, the computer 124 of the satellite terminal 105 determines whether a wired communications link to the cellular device 155 is present. A wired communications link, in this context, is a wired connection communicatively coupling the cellular device 155 to the satellite terminal 105. In an example, the wired communications link is a dedicated point-to-point link such as a Universal Serial Bus (USB) tether. A USB tether, in this context, means a wired USB bus connection between a USB port 126 on the satellite terminal 105 and a USB port 159 on the cellular device 155 for communications according to USB standards. As non-limiting examples, the computer 124 can detect the presence of a signal on the USB port 126 of the satellite terminal 105 indicating a connection to the cellular device 155 or send a query via the USB port 126 of the satellite terminal 105 to the cellular device 155 requesting confirmation of the presence of the cellular device 155. In the case that the tether is present, the process 300 continues in a block 312. Otherwise, the process 300 continues in a block 304.

In the block 304, the computer 124 determines whether a previously registered cellular device 155 is available for tethering via Wi-Fi. A previously registered cellular device 155 is a cellular device 155 which has been registered with the satellite terminal 105 as a cellular device 155 with which the satellite terminal 105 can tether prior to beginning a current execution of the process 200. The computer 124 can, for example, search for cellular devices 155 within a range for Wi-Fi for Wi-Fi communications with the satellite terminal 105, compare the identification codes for the cellular devices 155 with the identification codes of previously registered cellular devices 155. Within a range for Wi-Fi communications in this context means that a signal strength of the cellular device 155 as received by the satellite terminal 105 and a signal strength of the satellite terminal 105 as received by the cellular device 155 are respectively strong enough to be received and the data content therefrom extracted such that the cellular device 155 and the satellite terminal 105 can communicate with one another via Wi-Fi. In an example, the computer 124 can measure a signal strength of a received signal from the cellular device 155 and determine that the strength is sufficient (e.g., greater than a pre-programmed threshold) for communications. In another example, the satellite terminal 105 and cellular device 155 can exchange signals confirming respectively sufficient signal strength for communications.

In a case that one of the cellular devices 155 within the range for Wi-Fi communications with the satellite terminal 105 is a previously registered cellular device 155, the process 300 continues in a block 306. Otherwise, the process 300 continues in a block 314.

In the block 306, the computer 124 requests activation of a hotspot mode on the previously registered cellular device 155. A hotspot mode, as that term is used herein, is a mode of operation of the cellular device 155 in which the satellite terminal 105 can connect via Wi-Fi to the cellular device 155, and via the cellular device 155, connect to the Internet via the cellular communications network 150 in which the cellular device 155 is operating. In one case, requesting activation of the hotspot mode includes sending a message to a user of the satellite terminal 105, or the user of the previously registered cellular device 155, requesting that the user activate the hotspot mode on the previously registered cellular device 155.

In another case, the previously registered cellular device 155 can include programming to receive a command directly from the computer 124 to activate the hotspot mode. For example, an application can be loaded to the cellular device 155 to receive commands directly from the computer 124 via Wi-Fi to activate the hotspot mode. The computer 124 could be provided with a Wi-Fi password for the cellular device. In this case, the computer 124 can send the command directly to the cellular device 155 to activate the hotspot mode.

Upon requesting activation of the hotspot mode on the cellular device 155, the process 300 continues in a block 308.

In the block 308, the computer 124 confirms that the hotspot mode has been activated in the cellular device 155. For example, the computer 124 can request confirmation from the cellular device 155 via Wi-Fi that the cellular device 155 hotspot mode is activated. In the case that the hotspot mode is activated, the process 300 continues in a block 310. Otherwise, the process 314 continues in a block 314.

In the block 310, the computer 124 initiates cellular communications via the cellular device 155. That is, the computer 124 establishes communications between user devices 120 and the destination network 125 via the cellular communications channel. The process 300 continues in a block 312.

In the block 312, the computer 124 generates a signal, for example a stored digital flag, indicating that tethering was successful. The process 300 then ends, and the process 200 continues at a point following the block that had initiated the process 300.

In the block 314 the computer 124 generates a signal, for example a stored digital flag, indicating that tethering was unsuccessful. The process 300 then ends, and the process 200 continues at the block in the process 200 following the block that had initiated the process 300.

FIG. 4 is a flow chart for an example process 400 for selecting between a satellite communications channel and a cellular communications channel. The process 400 can be a sub-process of the process 200, as mentioned above. The process 400 begins in a block 402.

In the block 402, the computer 124 determines, based which of the satellite communications channel (i.e., the satellite terminal 105, the satellite 110 and the gateway 115) or the cellular communications channel (i.e., the cellular device 155, the cellular tower 160 and the cellular data center 165) tethered to the satellite terminal 105, offers better performance at a current moment in time based on the values of one or more performance parameters. As non-limiting examples, the computer 124 can compare data throughput for the two communications channels, latency for the two communications channels, or both data throughput and latency between the two communications channels. Based on the comparison, the computer 124 determines the communications channel which offers the better performance at the time of the comparison. The computer 124 may select the performance parameter used for comparing the communications channel based on current usage. For example, for streaming data such as a movie, the computer 124 may compare the throughput of the two communications channels. For Internet gaming, the computer 124 may compare the latency of the two communications channels. In the case that the satellite communications channel offers better performance, the process 400 continues in a block 404.

Determining that the cellular communications channel offers better performance at the time is a specified trigger event to initiate or continue communications via the cellular communications channel. In this case, the process 400 continues in a block 406.

In the block 404, the computer 124 sends and receives messages between the one or more user devices 120 and the destination network 125 via the satellite communications channel including the satellite terminal 105, the satellite 110 and the gateway 115. The process 400 ends and the process 200 resumes to continue or move from the process block in the process 200 at which the process 200 activated the process 400.

In the block 406, the computer 124 sends and receives messages between one or more user devices 120 and the destination network 125 via the satellite terminal 105 and the cellular communications channel including the cellular device 155, the cellular tower 160 and the cellular data center 165. The process 400 ends and process 200 resumes at the point where the process 200 activated the process 400.

Thus is disclosed a satellite communications network 100 including a satellite terminal 105 that is programmed to transfer communications between a satellite communications channel and a cellular communications channel by tethering to a cellular device 155.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "based on" herein means based on in whole or in part.

The term "exemplary" is used herein in the sense of signifying an example, e.g., a reference to an "exemplary widget" should be read as simply referring to an example of a widget.

In the drawings, the same reference numbers indicate the same elements. Further, some or all of these elements could be changed.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, network devices such as a gateway or terminal, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer.

Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A system comprising:
    a satellite communications terminal including a computer and a memory, the memory including instructions such that the computer is programmed to:
        provide communications for one or more user devices with a destination network;
        detect a physical state specified as a trigger event to transfer the communications for the one or more user devices with the destination network from a satellite communications channel to a cellular communications channel;
        upon detecting the trigger event, establish a communications link with a cellular device; and
        provide the communications for the one or more user devices with the destination network via the cellular device and the cellular communications channel,
    wherein the trigger event is a state of an electrical signal due to a contemporaneous user input to request the satellite communications terminal to select the cellular communications channel.

2. The system of claim 1, wherein the computer is further programmed to:
    detect that the satellite communications terminal is connected via a wired communications link to the cellular device; and
    establish the communications link with the cellular device via the wired communications link.

3. The system of claim 2, wherein the wired communications link is a wired Universal Serial Bus (USB) connecting the cellular device to the satellite communications terminal.

4. The system of claim 1, wherein the computer is further programmed to:
    detect that the cellular device is within a range for wireless communications with the satellite communications terminal; and
    establish the communications link via the wireless communications.

5. The system of claim 4, wherein the wireless communications are Wi-Fi communications.

6. The system of claim 4, wherein establishing the communications link with the cellular device via the wireless communications includes sending messages to a user to activate hotspot operation of the cellular device.

7. The system of claim 4, wherein establishing the communications link with the cellular device via the wireless communications includes sending commands to the cellular device to activate hotspot operation of the cellular device.

8. The system of claim 7, wherein the cellular device includes a second computer and a second memory, the second memory including instructions such that the second computer is programmed to:
    activate a hotspot mode by the cellular device based on receiving the instructions to activate the hotspot mode.

9. The system of claim 4, wherein detecting that the cellular device is within a range for wireless communications includes determining that the cellular device was previously registered with the satellite communication terminal.

10. The system of claim 1, wherein the computer is further programmed to:
    after transferring the communications for the one or more user devices with the destination network from the satellite communications channel to the cellular communications channel, monitor the satellite communication channel; and upon detecting that the satellite communication channel is operating within a specified operating range, transfer the communications for the one or more user devices with the destination network from the cellular communications channel to the satellite communications channel.

11. A method comprising:

providing, by a satellite communications terminal, communications for one or more user devices with a destination network;

detecting a physical state specified as a trigger event to transfer the communications for the one or more user devices with the destination network from a satellite communications channel to a cellular communications channel;

upon detecting the trigger event, establishing a communications link with a cellular device; and providing the communications for the one or more user devices with the destination network via the cellular device and the cellular communications channel, wherein the trigger event is a state of an electrical signal due to a contemporaneous user input to request the satellite communications terminal to select the cellular communications channel.

12. The method of claim 11, further comprising:

detecting that the satellite communications terminal is connected via a wired Universal Serial Bus (USB) to the cellular device; and establishing the communications link with the cellular device via the wired Universal Serial Bus (USB).

13. The method of claim 11, further comprising:

detecting that the cellular device is within a range for wireless communications with the satellite communications terminal;

confirming that the cellular device is included on a list of registered cellular devices to provide access to the cellular communications channel; and establishing, based on the confirmation that the cellular device is included on the list of the registered cellular devices, the communications link via the wireless communications.

14. The method of claim 13, wherein establishing the communications with the cellular device via the wireless communications includes sending messages to a user to activate a hotspot mode of the cellular device or sending commands to the cellular device to activate the hotspot operation of the cellular device.

15. The method of claim 11, further comprising:

detecting that the cellular device is within a range for wireless communications with the satellite communications terminal; and establishing the communications link via the wireless communications.

16. The method of claim 15, wherein establishing the communications link with the cellular device via the wireless communications includes sending a message to a user to activate hotspot operation of the cellular device.

17. The method of claim 15, wherein establishing the communications link with the cellular device via the wireless communications includes sending a command to the cellular device to activate hotspot operation of the cellular device.

18. The method of claim 15, wherein detecting that the cellular device is within a range for wireless communications includes determining that the cellular device was previously registered with the satellite communication terminal.

19. The method of claim 11, further comprising:

after transferring the communications for the one or more user devices with the destination network from the satellite communications channel to the cellular communications channel, monitoring the satellite communication channel; and upon detecting that the satellite communication channel is operating within a specified operating range, transferring the communications for the one or more user devices with the destination network from the cellular communications channel to the satellite communications channel.

* * * * *